(12) United States Patent
Kostrominov et al.

(10) Patent No.: US 9,840,145 B2
(45) Date of Patent: Dec. 12, 2017

(54) FUEL TANK WITH STIFFENING RIBS IN A POCKET FOR THE FUEL FILTER

(71) Applicant: Ford Global Technologies, LLC, Dearborn, MI (US)

(72) Inventors: Viktor Kostrominov, Schererville, IN (US); Marwan Ahmad Elbkaily, Canton, MI (US); Mustafa Usuf, West Bloomfield, MI (US); Bakhtyar Baig, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 14/467,712

(22) Filed: Aug. 25, 2014

(65) Prior Publication Data

US 2016/0052388 A1 Feb. 25, 2016

(51) Int. Cl.
| | |
|---|---|
| *B60K 15/03* | (2006.01) |
| *B60K 15/063* | (2006.01) |
| *B01D 35/00* | (2006.01) |
| *B01D 35/30* | (2006.01) |

(52) U.S. Cl.
CPC .......... *B60K 15/063* (2013.01); *B01D 35/005* (2013.01); *B01D 35/30* (2013.01); *B60K 15/03* (2013.01); *B60K 2015/03236* (2013.01); *B60K 2015/0636* (2013.01)

(58) Field of Classification Search
CPC ................. B60K 15/063; B60K 15/03; B60K 2015/03236; B01D 35/005; B01D 35/30
See application file for complete search history.

(56) References Cited

U.S. PATENT DOCUMENTS

| | | | | |
|---|---|---|---|---|
| 1,562,074 | A | * 11/1925 | Baum | .................... B64D 37/02 |
| | | | | 220/563 |
| 2,276,963 | A | * 3/1942 | Griffin | .................... B60K 15/00 |
| | | | | 220/DIG. 24 |
| 4,312,753 | A | 1/1982 | Bell | |
| 4,756,439 | A | * 7/1988 | Perock | ...................... D06F 1/04 |
| | | | | 15/264 |
| 5,366,246 | A | 11/1994 | Chen et al. | |
| 5,409,608 | A | 4/1995 | Yoshida et al. | |
| 6,109,310 | A | * 8/2000 | Peotter | ............. B60K 15/03504 |
| | | | | 141/59 |
| 6,293,770 | B1 | 9/2001 | Matsumoto et al. | |
| 6,408,979 | B1 | * 6/2002 | Forbes | ................... G10K 11/16 |
| | | | | 181/198 |

(Continued)

FOREIGN PATENT DOCUMENTS

| | | |
|---|---|---|
| CN | 202463556 U | 10/2012 |
| JP | H1162755 A | 3/1999 |
| KR | 20130055085 A | 5/2013 |

*Primary Examiner* — Tony H Winner
*Assistant Examiner* — Marlon A Arce
(74) *Attorney, Agent, or Firm* — Jason Rogers; Brooks Kushman P.C.

(57) ABSTRACT

An improved fuel tank is disclosed that includes a plurality of recessed ribs formed in the fuel tank adjacent a fuel filter. The fuel filter is received in a pocket formed in the lateral side of the fuel tank by a front side wall and rear side wall that extend from the lateral side to a recessed wall. The ribs include an inner portion, a transverse portion and an outer portion. The recessed ribs have upper and lower walls that converge toward a base wall.

16 Claims, 2 Drawing Sheets

(56) References Cited

U.S. PATENT DOCUMENTS

| | | | | |
|---|---|---|---|---|
| 6,571,978 | B1 * | 6/2003 | Puempel | B60K 15/03177 |
| | | | | 220/562 |
| 7,552,839 | B2 * | 6/2009 | Padget | F01P 11/029 |
| | | | | 220/564 |
| 7,585,000 | B1 * | 9/2009 | Hoek | A01M 7/0085 |
| | | | | 220/562 |
| 7,819,272 | B2 * | 10/2010 | Sugiura | B60K 15/03177 |
| | | | | 220/563 |
| 7,854,345 | B2 * | 12/2010 | Kallevig | B60K 15/03 |
| | | | | 137/587 |
| 8,636,162 | B2 * | 1/2014 | Schoen | B60K 15/03 |
| | | | | 220/4.14 |
| D701,814 | S * | 4/2014 | Merchant | D12/218 |
| 8,895,092 | B1 * | 11/2014 | Field | B65B 25/06 |
| | | | | 206/497 |
| 9,140,409 | B2 * | 9/2015 | Kataoka | F02M 37/0023 |
| 9,321,347 | B2 * | 4/2016 | Cragel | B60K 15/077 |
| 2003/0015537 | A1 * | 1/2003 | Konja | B60K 15/077 |
| | | | | 220/563 |
| 2014/0191498 | A1 * | 7/2014 | Shipp | B60K 15/067 |
| | | | | 280/834 |
| 2014/0366963 | A1 * | 12/2014 | Kataoka | F02M 37/0023 |
| | | | | 137/430 |

\* cited by examiner

FUEL TANK WITH STIFFENING RIBS IN A POCKET FOR THE FUEL FILTER

TECHNICAL FIELD

This disclosure relates to fuel tank structures for vehicles and in particular to reinforcing ribs formed in the fuel tank in the area of a pocket defined by the fuel tank that receives a fuel filter.

BACKGROUND

Under current safety design guidelines, automotive vehicles are tested in a 50 MPH Perpendicular Side Impact Test. The test is intended to test fuel system integrity in a side impact collision.

In one fuel tank design for a diesel fuel vehicle, the fuel tank defines a U-shaped pocket that partially encompasses a diesel fuel filter. The pocket has an open side that faces a frame rail and has a two side walls that extend laterally inward from an outer wall of the fuel tank to a recessed wall. The fuel filter is attached to the recessed wall. The sidewalls extend laterally beyond the fuel filter.

With the above design, the vehicle was tested in the 50 MPH Perpendicular Side Impact Test and resulted in the frame rail deforming the fuel tank and contacting the fuel filter. Several approaches were evaluated to improve the test results including increasing the gauge of the fuel tank material and building a structural reinforcement around the fuel tank. However, neither approach was feasible from the standpoint of manufacturing or packaging the fuel tank within the vehicle. Another approach was to weld a reinforcement patch within the U-shaped pocket around the fuel filter but this approach also proved to be unsatisfactory.

This disclosure is directed to the problem of reducing the deformation of the fuel tank and mitigating the fuel filter contact by the frame rail in the 50 MPH Perpendicular Side Impact Test. This disclosure also addresses other problems as summarized below.

SUMMARY

According to one aspect of this disclosure, a fuel tank is disclosed that is assembled adjacent a frame rail of a vehicle. The fuel tank comprises an enclosure defining a pocket that is formed by two side walls that extend laterally inward from a lateral side to a recessed wall and that has an open side facing the frame rail. A plurality of horizontally extending recessed ribs are provided that extend from the recessed wall, across one side wall, and into the lateral side.

According to another aspect of this disclosure, a fuel tank assembly for a vehicle is disclosed that comprises a fuel filter and a fuel tank. The fuel tank has a lateral side that defines a pocket that is formed by two side walls that extend laterally inward from the lateral side to a recessed wall. A plurality of vertically spaced, horizontally extending recessed ribs are provided in the pocket that span at least one of the side walls.

According to yet another aspect of this disclosure, a fuel tank assembly for a vehicle is disclosed that comprises a fuel filter and a fuel tank. The fuel tank has a lateral side defining a pocket that is formed by two side walls that extend laterally inward from the lateral side to a recessed wall and has an open side. A plurality of vertically spaced, horizontally extending recessed ribs are provided in the pocket that have an upper wall and a lower wall that converge where they are joined to a base wall.

According to other alternative aspects of this disclosure, the ribs may be vertically spaced apart from each other. A portion of the recessed ribs in the recessed wall may be shorter than a portion of the ribs in the one side wall. A portion of the recessed ribs in the lateral side may be shorter than a portion of the ribs in the one side wall.

The ribs may have an upper wall and a lower wall that converge where they are joined to a base wall. The upper wall, the lower wall and the base wall may all be planar walls.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
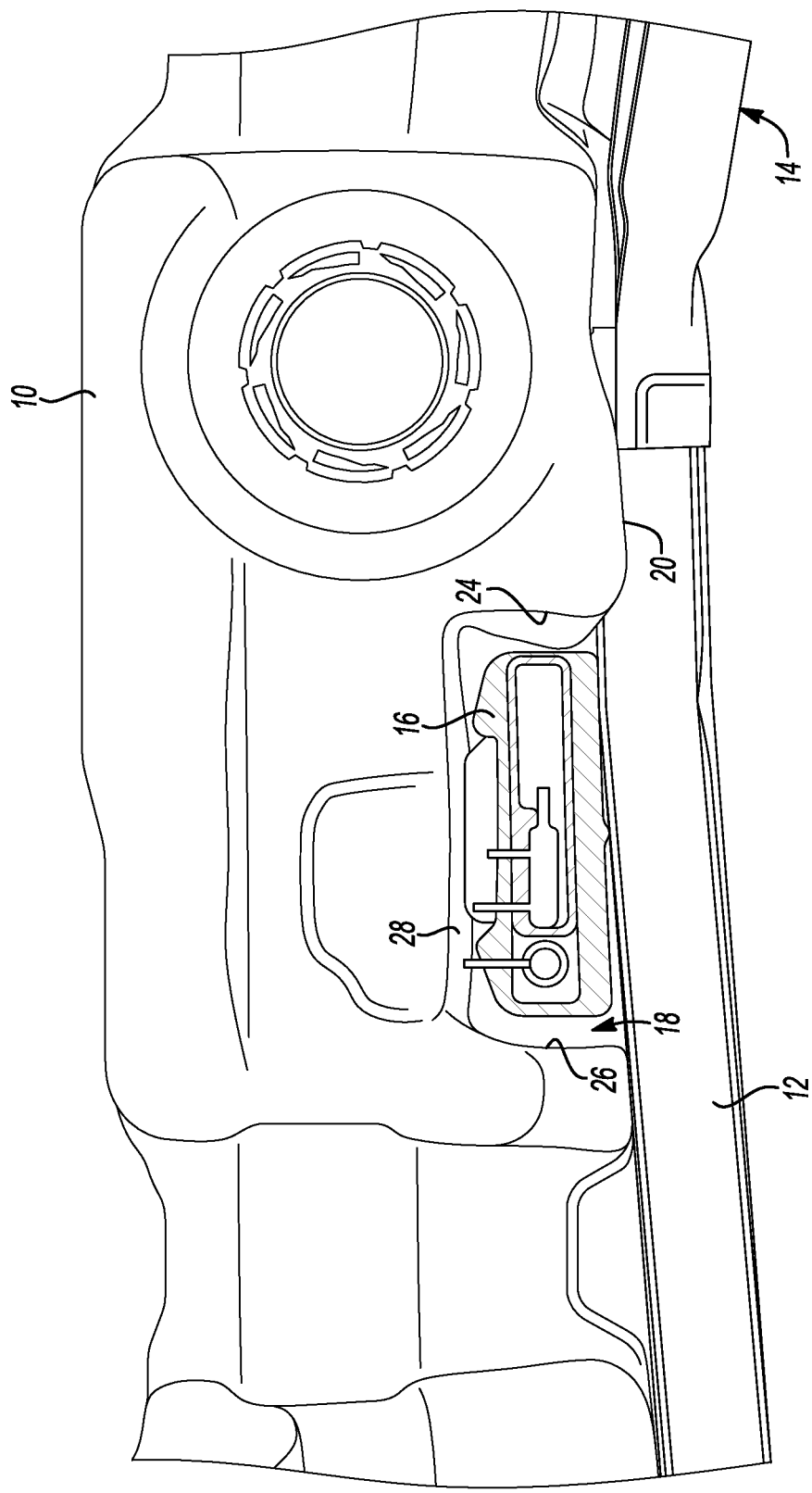
FIG. 1 is a fragmentary top plan view showing a prior art fuel tank with a fuel filter in cross-section after being tested in a 50 MPH Perpendicular Side Impact Test.

Referring to FIG. 1, a fuel tank 10 is illustrated that is made in accordance with the prior art. The fuel tank 10 is located adjacent a frame rail 12 of a vehicle generally indicated by reference numeral 14. A fuel filter 16 is disposed in a pocket 18 formed in a lateral side 20 of the fuel tank 10.

The pocket 18 includes a rear side wall 24 and a front side wall 26 that extend from the lateral side 20 of the fuel tank 10 to a recessed wall 28.

Figure 2:
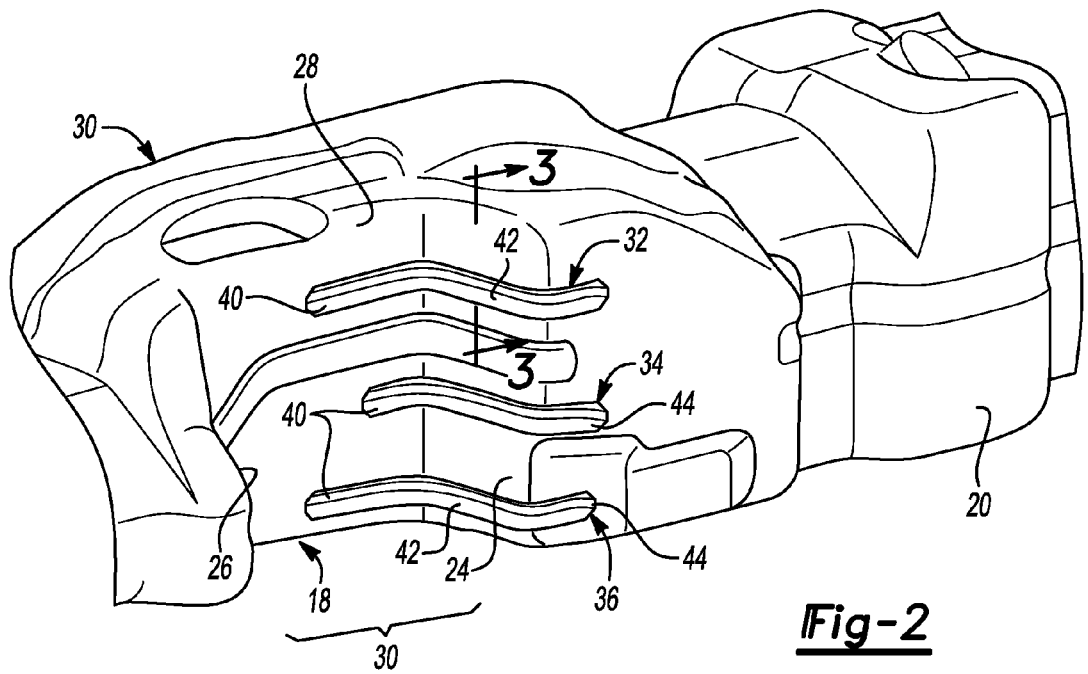
FIG. 2 is a fragmentary perspective view of an improved fuel tank made according to one embodiment of this disclosure.

Referring to FIG. 2, an improved fuel tank 30 is illustrated that includes a pocket 18 formed in the lateral side 20 of the fuel tank 30. The pocket 18 is formed by a rear side wall 24 and a front side wall 26 that extend from the lateral side 20 to a recessed wall 28.

The improved fuel tank 30 includes a top recessed rib 32, an intermediate recessed rib 34 and a bottom recessed rib 36. It should be understood that the invention may be practiced by including one or more ribs depending upon the structural requirements for reinforcing the fuel tank 30. Each of the recessed ribs 32-36 include an inner portion 40 formed in the recessed wall 28. A transverse portion 42 formed in the front side wall 24 and an outer portion 44 formed in the lateral side 20. It should be understood that the intermediate recessed rib 34 may be formed on either the front side wall 24 of the rear side wall 26 provided that the intermediate recessed rib 34 is contiguous with the top recessed rib 32 and the bottom recessed rib 36. The inner portion 40 and outer portion 44 in the illustrated embodiment are shorter than the transverse portion 42 of the recessed ribs 32-36.

Figure 3:
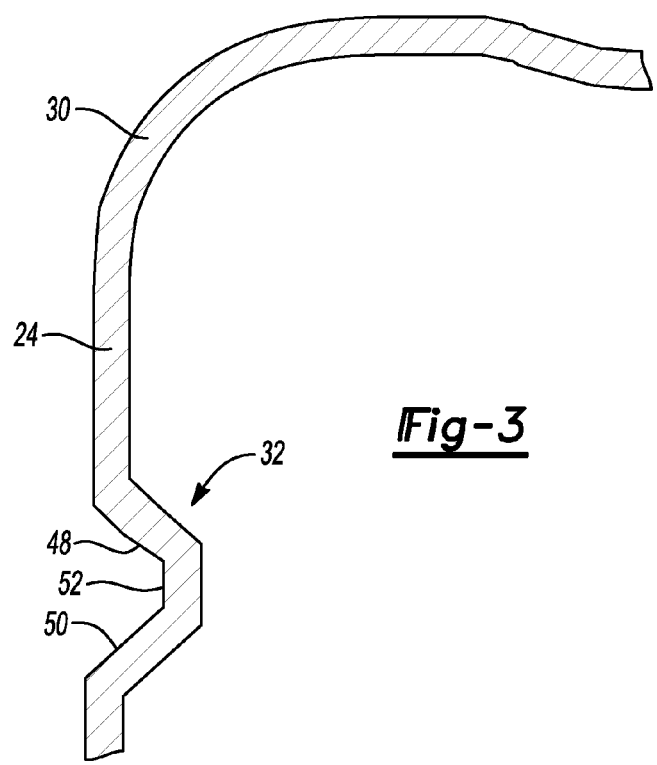
FIG. 3 is a cross-sectional view taken along the line 3-3 in FIG. 2.

Referring to FIG. 3, a cross section is taken through the improved fuel tank 30 (shown in FIG. 2) to illustrate the structure of each of the recessed ribs. In FIG. 3, the recessed rib illustrated is the top recessed rib 32. The recessed rib 32 is formed in the improved fuel tank 30 and the section is taken through the front side wall 24. The recessed rib 32 includes an upper wall 48 and a lower wall 50 that extend from the front side wall 24 to a base wall 52. The upper wall 48 and base wall 52 converge from the front side wall 24 to the base wall 52. The upper wall 48, lower wall 50 and base wall 52 in the illustrated embodiment are planar walls that are provided to reinforce the fuel tank 30. While the walls, as illustrated, meet at a sharp internal angle, it should be understood that the intersections of the walls 48-52 may include a radius at the juncture of the walls.

In a collision, such as a side impact collision, the reinforcing ribs or recessed ribs 32-36 reinforce the fuel tank in the area of the fuel filter 16 (shown in FIG. 1). The reinforcing ribs strengthen the fuel tank 30 so that the frame rail 12 (shown in FIG. 1) is inhibited from contacting the fuel filter 16 (shown in FIG. 1) and excessively deforming the fuel tank 30. By avoiding excess deformation of the fuel tank 30 and inhibiting the frame rail 12 from contacting the fuel filter 16, the integrity of the fuel system as measured in a 50 MPH Perpendicular Side Impact Test is improved.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A fuel tank assembled adjacent a frame rail of a vehicle comprising:
   an enclosure defining a pocket that is formed by two side walls that extend laterally inward from a lateral side to a recessed wall and having an open side facing the frame rail, a plurality of horizontally extending recessed ribs in the recessed wall, across one side wall, and in the lateral side.

2. The fuel tank of claim 1 wherein the ribs are vertically spaced apart from each other.

3. The fuel tank of claim 1 wherein an inner portion of the recessed ribs in the recessed wall are shorter than a portion of the ribs in the one side wall.

4. The fuel tank of claim 1 wherein an outer portion of the recessed ribs in the lateral side are shorter than a portion of the ribs in the one side wall.

5. The fuel tank of claim 1 wherein an inner portion of the recessed ribs in the recessed wall are shorter than a portion of the ribs in the one side wall and an outer portion of the recessed ribs in the lateral side are shorter than the portion of the ribs in the one side wall.

6. The fuel tank of claim 1 wherein the ribs have an upper wall and a lower wall that converge where they are joined to a base wall.

7. The fuel tank of claim 6 wherein the upper wall, the lower wall and the base wall are planar walls.

8. A fuel tank assembly for a vehicle comprising:
   a fuel filter; and
   a fuel tank having a lateral side defining a pocket that is formed by two side walls that extend laterally inward from the lateral side to a recessed wall and having an open side, a plurality of vertically spaced, horizontally extending recessed ribs in the pocket that span at least one of the side walls.

9. The fuel tank assembly of claim 8 wherein the recessed ribs extend into the recessed wall and into the lateral side.

10. The fuel tank assembly of claim 9 wherein a portion of the recessed ribs in the recessed wall are shorter than a portion of the ribs in the at least one side wall.

11. The fuel tank assembly of claim 9 wherein a portion of the recessed ribs in the lateral side are shorter than a portion of the ribs in the at least one side wall.

12. The fuel tank assembly of claim 9 wherein a portion of the recessed ribs in the recessed wall are shorter than a portion of the ribs in the at least one side wall and a portion of the recessed ribs in the lateral side are shorter than the portion of the ribs in the at least one side wall.

13. The fuel tank assembly of claim 8 wherein the recessed ribs have an upper wall and a lower wall that converge where they are joined to a base wall.

14. The fuel tank assembly of claim 13 wherein the upper wall, the lower wall and the base wall are planar walls.

15. A fuel tank assembly for a vehicle comprising:
    a fuel filter; and
    a fuel tank having a lateral side defining a pocket that is formed by two side walls that extend laterally inward from the lateral side to a recessed wall and having an open side, a plurality of vertically spaced, horizontally extending recessed ribs in the pocket that have an upper wall and a lower wall that converge where they are joined to a base wall.

16. The fuel tank assembly of claim 15 wherein the upper wall, the lower wall and the base wall are planar walls.

* * * * *